May 30, 1939.    H. E. BALSIGER    2,160,378
WORK REST
Original Filed Feb. 8, 1935    5 Sheets-Sheet 3
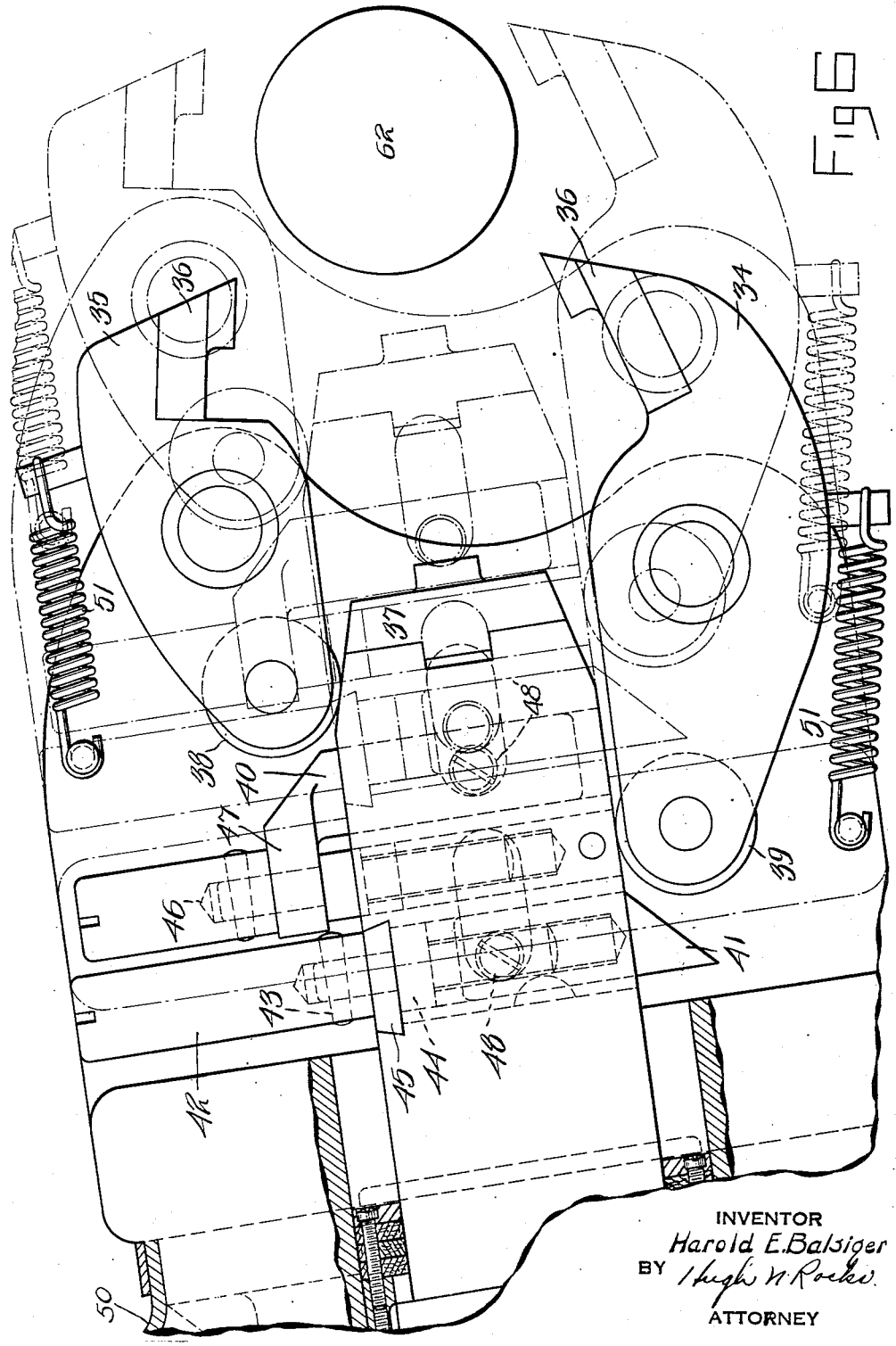
INVENTOR
Harold E. Balsiger
BY Hugh N. Rocker
ATTORNEY

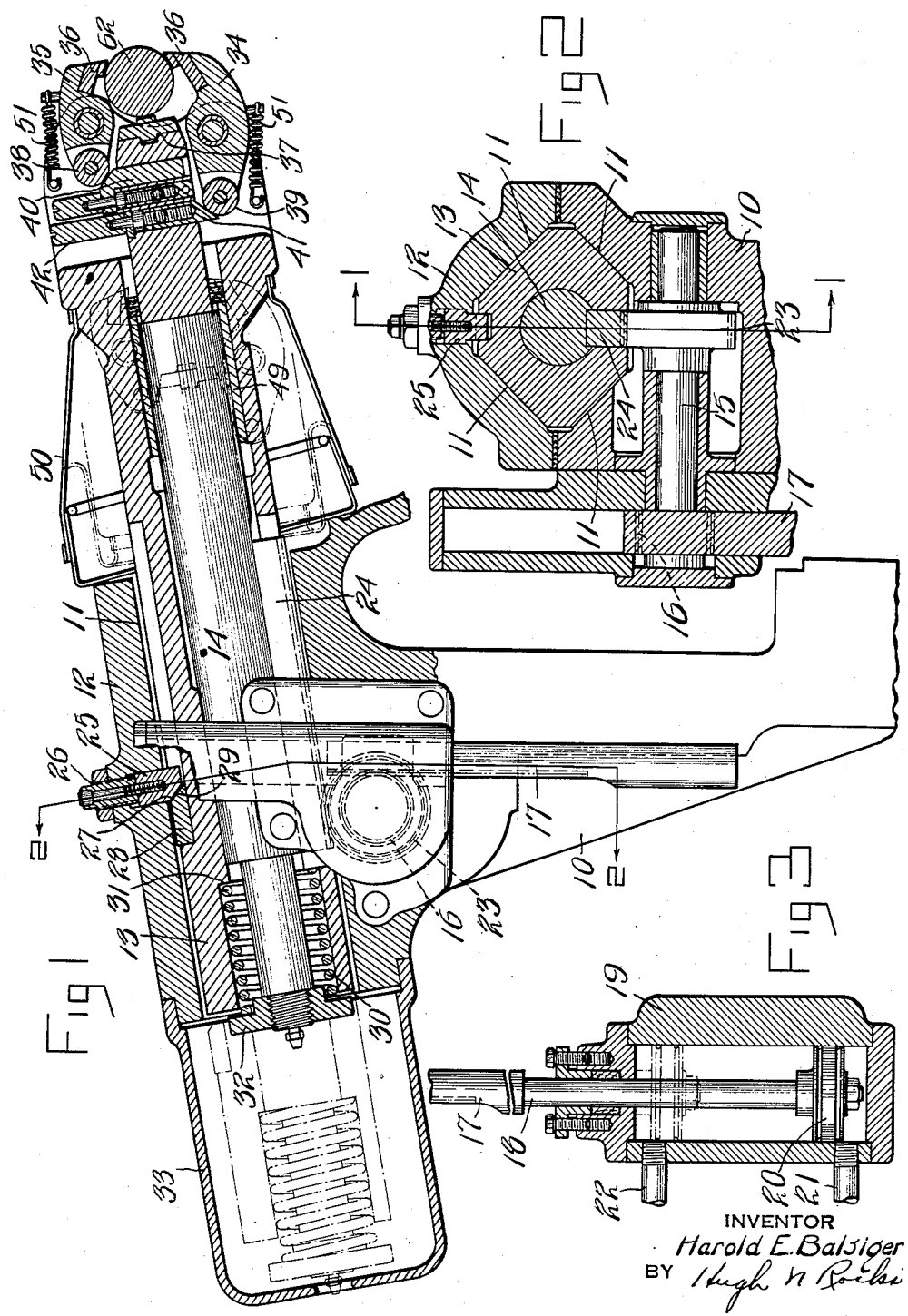

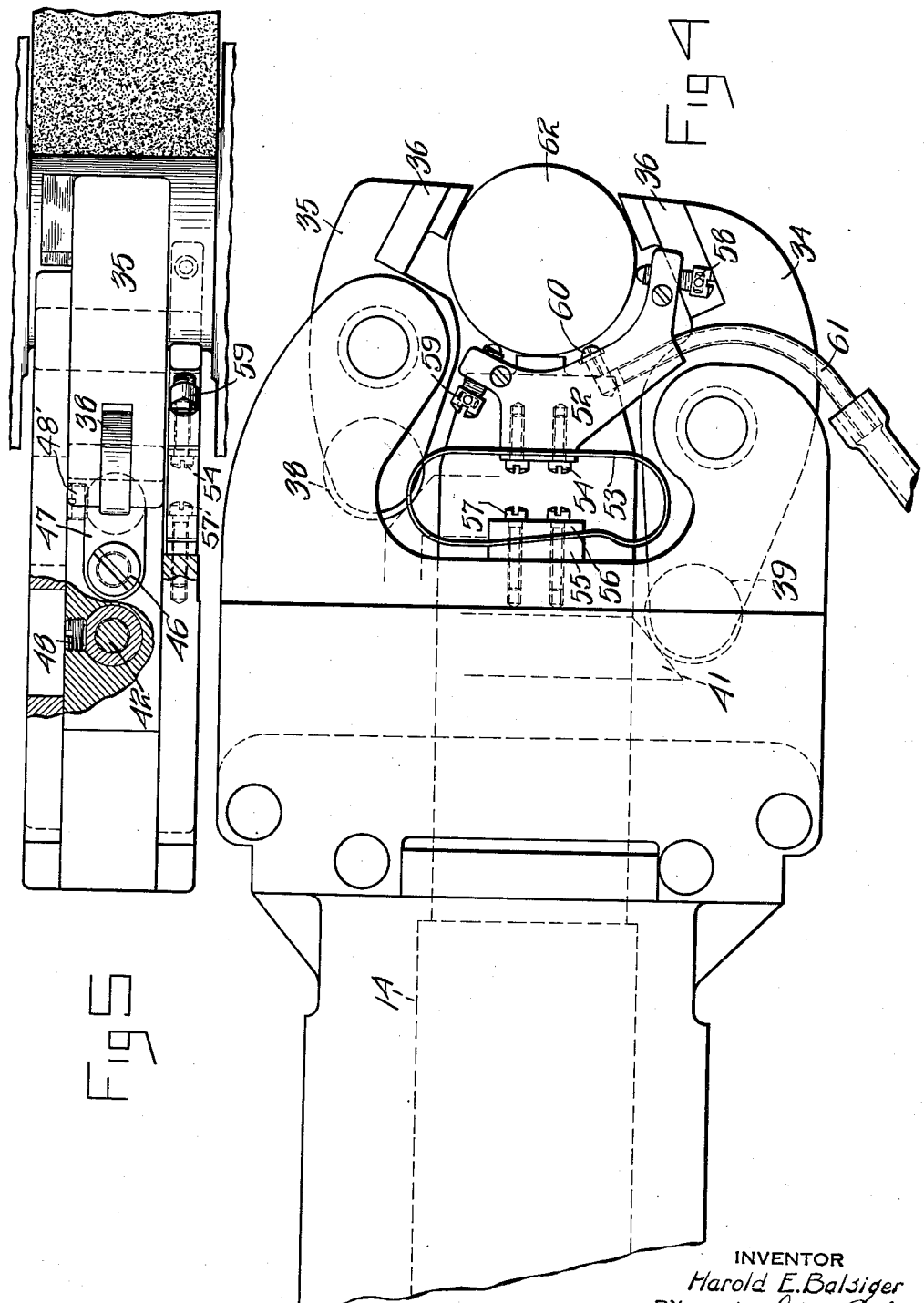

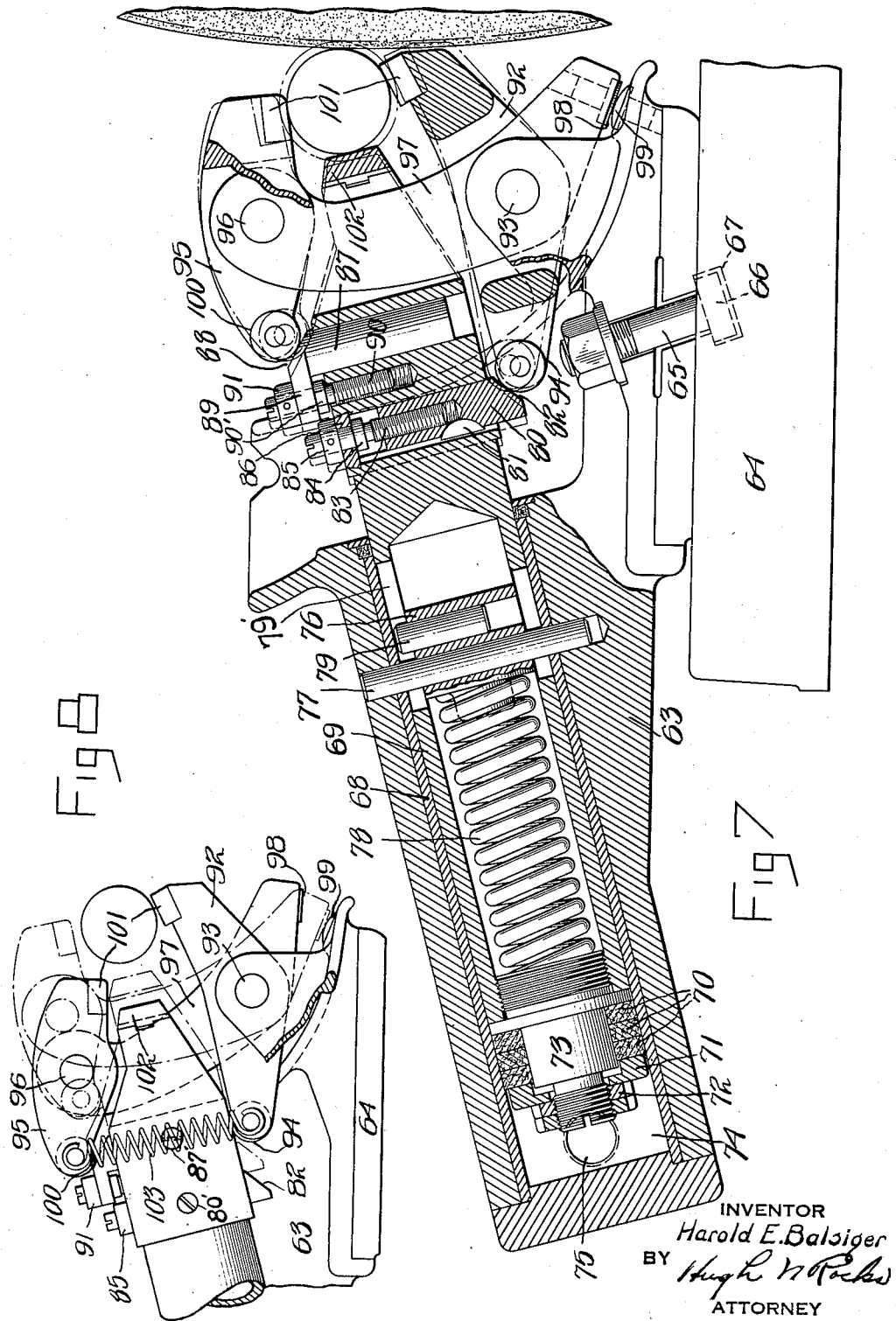

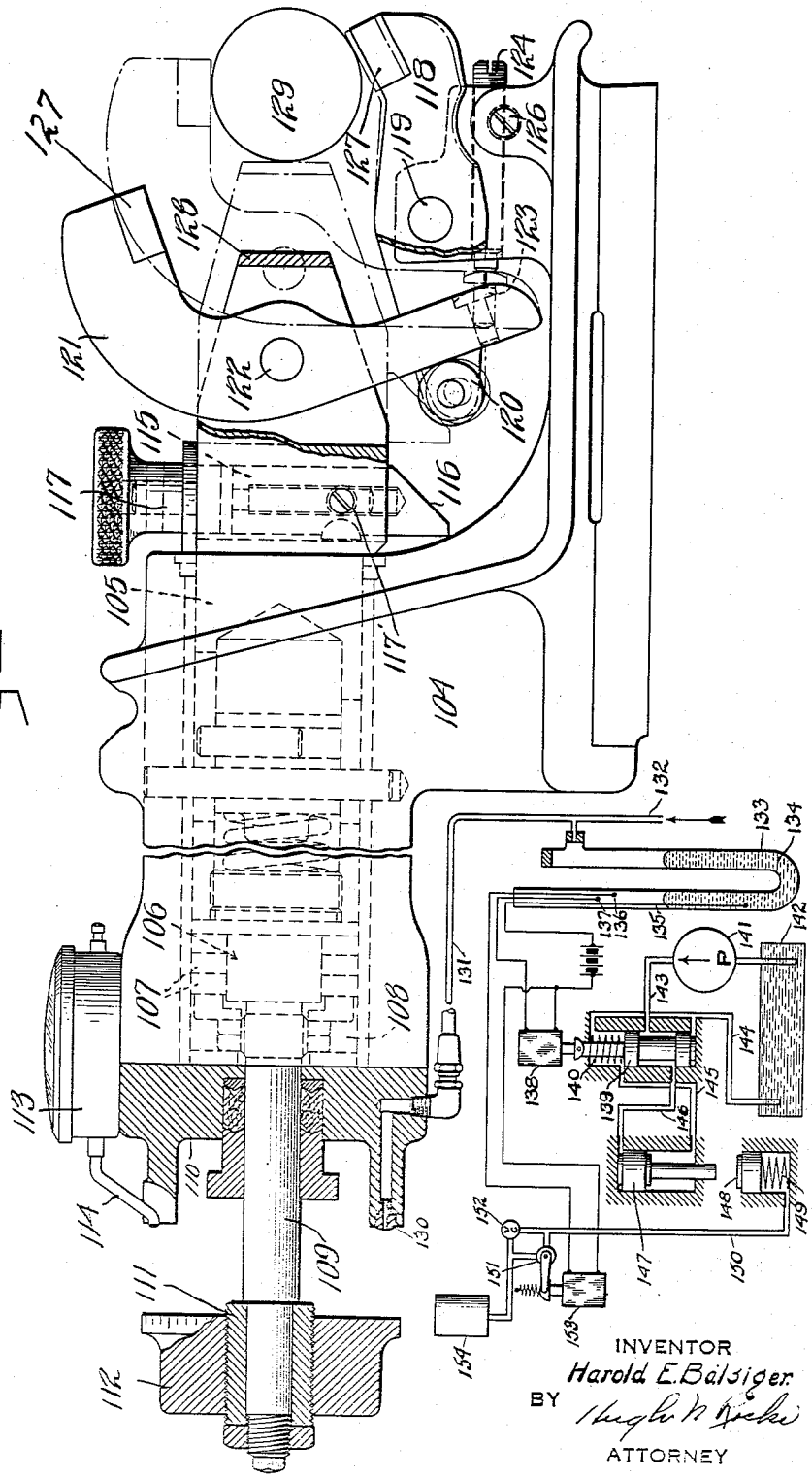

Patented May 30, 1939

2,160,378

UNITED STATES PATENT OFFICE 2,160,378

WORK REST

Harold E. Balsiger, Waynesboro, Pa., assignor to Landis Tool Company, Waynesboro, Pa., a corporation of Pennsylvania Application February 8, 1935, Serial No. 5,677
Renewed September 30, 1937

18 Claims. (Cl. 51—238)

This invention relates to work-rests for use primarily with machine tools. An object of the invention is to provide a work-rest which will rigidly support the work to prevent it from flexing in any direction and particularly to center the work and maintain that center in a fixed position coinciding with the axis of rotation thereof while said work is being operated upon.

Another object of my invention is to provide a plurality of shoes which are adapted to move into engagement with a work piece and thereafter to move toward a common center at a rate determined only by the rate of stock removal from the work piece.

Another object is to utilize the movement of the shoes or some associated element to operate a size control mechanism.

The conventional steady rest having one or two shoes held in contact with a work piece by manual, hydraulic, or other suitable means has never performed its function satisfactorily especially when the shoes contact the portion of the work from which stock is being removed and therefore require constant adjustment.

The purpose of a steady rest is, as its name implies to steady the work piece against the forces exerted by the tool. The ideal steady rest would exert a force exactly equal in magnitude and direction to the force exerted by the tool. Since the force exerted by the tool is necessarily continually varying both in magnitude and direction due to variation in the amount of stock removed, the condition of the material, and various other conditions characteristic of a machining operation, the ideal steady rest has another function. It must exert against the work piece a force or forces which are continuously variable to correspond with or to counteract the forces exerted by the tool.

I have approached this ideal condition by constructing a steady rest having three shoes adapted to be suitably spaced about the surface of the work piece. One of these shoes is mounted on a plunger which is adapted to be moved toward and from the work piece. The other two shoes are mounted on arms which are actuated by movement of the plunger. The arms and the plunger are designed so that all the shoes move toward a predetermined point at exactly the same speed so that when they are in contact with a work piece one shoe will not be so moved that it will bear more heavily on the work than the others except to counteract outside forces.

If the center of the work piece coincides with the predetermined point toward which the shoes are moving the shoes will engage the work at the same time and continue to engage it thruout the machining operation. Any force tending to shift the work from its axis will be counteracted in direction and magnitude by one or more of the steady rest shoes. If the center of the work piece does not coincide with the predetermined point toward which the shoes are moving, one or more of the several shoes will act to force the work to a position where said center and said point do coincide.

Referring to the accompanying drawings which are made a part hereof and on which similar reference characters indicate similar parts.

Figure 1 is a longitudinal section of the work rest,

Figure 2 is a section on line 2—2 of Figure 1,

Figure 3 is a section of the motor for operating the work-rest.

Figure 4 is a side elevation of the front end of the work-rest showing the work-rest when in operative position Figure 5 is a plan view of the portion shown in Figure 4, Figure 6 is a side elevation of the front end of the work-rest showing it in intermediate position, Figure 7 is a side elevation partly in section of a modified form of work-rest.

Figure 8 is a side elevation of the front end of the work-rest in Figure 7 with the parts in retracted or inoperative position, and Figure 9 is a side elevation of a further modified form of the invention.

In the drawings numeral 10, Figs. 1 and 2 indicates a base adapted to be secured on the machine tool, such for example as on the front of the bed of a grinding machine. The work-rest however, may be mounted in positions other than on the front of the bed of the grinding machine, as for example, on the work carriage or in any other suitable position on the machine. The base 10 has a cap portion 12 forming an enclosed guideway 11. A plunger carrier 13 is mounted for longitudinal movement in the guideway 11. A plunger 14 is mounted for longitudinal movement within the carrier 13. A shaft 15 is journaled in the base 10 and is provided at its outer end with a pinion 16 engageable by a rack 17 formed upon or secured to a piston rod 18 which extends out through the head of a cylinder 19, the piston rod carrying a piston 20 which operates within the cylinder. Pressure fluid for operating the piston is supplied to and exhausted from the cylinder through fluid lines 21 and 22. The inner end of the shaft 15 carries a pinion 23 which engages a rack 24 secured to the lower side of the plunger 14. A stop pin 25 is positioned in the cover 12 and is adjustable by means of a screw 26. The pin 25 has a beveled surface 27 which is engageable by the beveled surface 29 of a block 28. The plunger 14 has an end which is surrounded by a spring 30, one end of which engages a shoulder 31 on the inner side of the carrier 13, the other end of the spring resting against the inner side of a nut 32 which is screw threaded on the end of the plunger. A hood 33 is secured on the end of the casing to form a chamber which provides an operating space for the end of the plunger. Adjacent the forward end of the plunger support 13 are pivotally mounted work engaging lower and upper jaws 34 and 35, these jaws having work engaging shoes 36 secured thereon in any suitable way. The forward end of the plunger also has a shoe 37. These jaws, at their rear ends, carry rollers 38 and 39 which are engageable by cam blocks 40 and 41 respectively. The cam block 41 is mounted in the forward end of the plunger 14 and is adjustable therein. In order to facilitate adjustment a cap 42 is secured to the upper end of an adjusting screw as by means of a pin 43 (Fig. 6). A flange 44 on the screw is positioned beneath a plate 45 which is seated in a dove-tailed slot in the top of the plunger. The cap 42 and the flange 44 prevent endwise movement of the screw. The cam 40 has a lateral portion 47 through which extends a similar screw 46. The screws are locked in adjusted position by set screws 48. A sleeve 49, Fig. 1, is fitted about the forward end of the plunger within the plunger support and packing material is secured at the end of the sleeve to prevent the entry of water and grit into the plunger support. A flexible water guard 50 is positioned about the forward end of the plunger support. Springs 51 are secured at one end to the pivoted jaws 34 and 35 and at their other ends to pins on the forward end of the plunger support 13. These springs tend to swing the jaw so as to release the shoes from contact with the work.

As shown in Figure 4 a working sizing device including a block 52 may be mounted in one side of the plunger support. This block is mounted upon a spring 53 by means of screws 54. The spring in turn is mounted between a pair of blocks 55 and 56 and secured to one side of the forward end of the plunger support by means of screws 57. Contact screws 58 and 59 are carried in the ends of the block 52 and have wear resisting ends which engage the surface of the work. A fluid nozzle 60 is positioned intermediate the contact screws 58 and 59 and a conduit 61 communicates with the nozzle 60, through which conduit pressure fluid for operating the sizing device is supplied to the nozzle. The sizing device may be that shown in my copending application Ser. No. 598,498 filed March 12, 1932.

The operation of the device as so far described is as follows: With the parts as shown in dot and dash lines in Figure 1 the plunger is retracted and the work engaging jaws are in open position. Operating fluid is supplied to the cylinder 19 (Fig. 3) through conduit 22 to apply pressure to the upper side of piston 20. Through the rack and pinions the plunger 14 and the plunger carrier 13 are moved forward, the plunger carrier being carried forward by the spring 30. This movement continues until the stop block 28 engages the stop block 25. The beveled contacting surfaces of these blocks cause the carrier to be clamped against the ways 11 in base 10. When the plunger support is in this position the work engaging jaws will be in the dot and dash line position shown in Figure 6 with the jaws out of engagement with the work but in their forward position. Plunger 14 will continue to move forward to a position where cam surfaces 40 and 41 will engage rollers 38 and 39 respectively and from which position all the jaws move simultaneously into engagement with the work. Further movement of the plunger 14 forward will cause the plunger to move relative to the plunger carrier. As the plunger moves forward the cam blocks 40 and 41 engage the rollers 38 and 39 respectively to rock the jaws on their pivots and bring the shoes 36 into contact with the work piece 62. The shoe 37 on the forward end of the plunger will come into engagement with the side of the work piece. The cam surfaces 40 and 41 are capable of adjustment so that the three work engaging members will contact with the surface of the work with a restraining pressure so as to hold the work centered. As the work diminishes in size, all three work engaging members will move toward this common center by similar increments of movement. In other words, one cannot move without the other. If, for example, the work engaging member at the top (Fig. 2) cannot move in because the work is shifted off center in that direction, then the member at the end of the plunger, and also the lower work member would not be free to move it, and all the pressure back of the plunger through the cam acting on the work member at the top would be exerted against the work for forcing it back to a common center, where all three work members bear upon the work and restrain it against radial movement. The work piece is, therefore, engaged at three different positions about its periphery, so that it is held firmly against radial movement in any direction during the grinding operation. The cam surfaces 40 and 41 are capable of being shifted so as to vary the timing of the work engaging members controlled thereby, and these cams may be so set that the work engaging members will be brought into contact with the surface of the work to be ground simultaneously. The fluid pressure operating on the plunger will exert a substantially equal pressure against the work by each work engaging member. As the work decreases in diameter during grinding, the work engaging member carried by the plunger moves toward the center of rotation, and while the cam surfaces 40 and 41 will impart an equal movement of the work supporting members controlled by the respective cam surfaces, toward the center of rotation. Thus it is that the work engaging members are simultaneously and uniformly urged toward the center of rotation of the work during the grinding operation, and are also maintained at the same distance from the center of rotation of the work.

Figures 7 and 8 show a modified form of workrest illustrating the same general principle as that shown in Figures 1 to 6. In this form of the device a work-rest body 63 is adapted to be mounted upon a support 64 which support may be the work support, work carriage or may be the bed of the machine. The device is secured in position by means of a bolt 65 having a head 66 engaging in a T-slot 67 in the work carriage or other support 64. The base 63 is preferably provided with a lining sleeve 68 within which is slidably mounted a plunger 69. The rear end of the plunger is provided with a piston 73 including packing rings 70 which are secured in position by a cap 71 held on by nuts 72 which are threaded on the threaded end of said piston 73. The piston 73 is screwed into the threaded end of plunger 69. A pressure chamber 74 is formed between the end of the plunger and the head of the chamber to which chamber pressure fluid is supplied through a port 75. A block 76 is positioned within the plunger and held in position by a pin 77 which is seated in suitable openings in the support 63. A spring 78 is seated against the block 76 and the other end against the inner end of the piston 73. Obviously the positions of spring 78 and pressure chamber 74 might be reversed. During assembly the plunger 69 is prevented from turning by means of a pin 79 in block 76, said pin extending into slot 79' in said plunger. A cam block 80 is positioned in the forward end of the plunger. This block has a key 81 which prevents it from turning and has a cam surface 82 at its under side. The block is adjustable transversely of the plunger by means of an adjusting screw 83, the screw having a flange portion 84 and a collar 85 positioned at opposite sides of a block 86 which is seated in a dovetailed socket in the plunger. Rotation of the adjusting screw 83 will move the block 80 transversely of the plunger. A block 87 has an upper forward cam portion 88 and this block has a bracket portion 89 which is engaged between the flange portion 90' and the collar 91 on the adjusting screw 90 by means of which screw the block 87 is adjustable transversely of the plunger. Screws 80' and 87' lock the plungers 80 and 87 to prevent any change after adjustment is made. A jaw 92 is pivoted at 93 to a lug on the base 63. The rear end of the jaw carries a roller 94 which is engageable by the cam surface 82 on the block 80. An upper jaw 95 is pivoted at 96 on the upper end of a lever 97 which lever is also pivoted at 93. The lower end of this lever carries a hardened pin 98 engageable with a stop pin 99 in the support 63. The rear end of the jaw 95 carries a roller 100 engageable by the cam surface 88 on the block 87. The forward ends of the jaws 92 and 95 carry shoes 101 and the forward end of the plunger 69 has a work engaging shoe 102. A spring 103 attached to the rear ends of the jaws 92 and 95 tends to hold these jaws in open position.

In operation pressure fluid is supplied to the rear of the piston 73 to move it forward to work engaging position. As the plunger moves forward the cam surface 88 first engages the roller 100. The tension of the spring 103 is strong enough to prevent the jaw 95 from pivoting at 96 on the lever 97 until the lever has pivoted on its pivot 93 to bring the stop 98 into contact with the stop 99. When these stops engage, the lever 97 is prevented from further pivoting at 93 so that further movement of the plunger 69 forward will cause the jaw 95 to pivot clockwise to bring the shoe into engagement with the work-piece. This latter shifting of the jaw 95 will occur at the same time that the surface 82 comes into engagement with the roller 94 on the jaw 92 so that this latter jaw will also be swung on its pivot to bring its shoe also into engagement with the work. The cam surfaces 82 and 88 will be positioned by adjustment of the blocks 80 or 87 so that the shoes 101 will approach the work-piece simultaneously with the shoe 102 on the forward end of the plunger.

The movement of shoes 101 and 102 after engaging the work and during the grinding thereof is similar to that of shoes 36 and 37 in Figs. 1 to 6 inclusive.

In Figure 9 there is shown a still further modified form illustrating the same general principle. This form may be positioned upon the work carriage or upon the bed of the machine and consists of a support 104 having a chamber in which the plunger 105 operates. This plunger carries a piston 106 with the usual packing 107. Pressure fluid is supplied at the rear of the piston in chamber 108. A piston rod 109 extends out through a cap 110 which closes the piston chamber. The rear end of the piston rod 109 carries a threaded nut 111 upon which a nut 112 is mounted. A gage 113 is mounted on the support 104 and has an arm 114 engageable by the nut 112. The nut 112 is calibrated to facilitate adjustment to determine any given position as indicated by the gage 113. The forward end of the plunger carries a cam block 115 having a cam surface 116 on its lower end, the block being adjustable transversely of the plunger by means of the screw 117 and locked in adjusted position by screw 117'. A jaw 118 is pivoted at 119 to the support 104 and the rear end of this jaw carries a roller 120 which is engageable by the cam surface 116. A second jaw 121 is pivoted at 122 to the forward end of the plunger 105. The lower end of this jaw has a stop pin 123 adapted to come into contact with the rear end of an adjustable stop screw 124. A set screw 126 is provided for locking the adjustable screw 124 in adjustable position. The jaws 118 and 121 have work engaging shoes 127. The forward end of the plunger 105 also has a work engaging shoe 128. The operation of this form of the device is as follows:

When the plunger is retracted the jaw 121 is moved back to the position shown in full lines in Figure 9 at which position the work piece 129 may be lifted freely from the shoe 127. When the parts are moved to operative position the pressure fluid is supplied to the chamber 108 and the plunger 105 moves forward. This movement brings the jaw 121 to the dotted line position shown in Figure 9. This jaw pivots due to engagement of the stop pin 123 with the end of the stop screw 124. The cam 116 engages the roller 120 to swing the jaw 118 also into work engaging position at the same time that the shoe on the jaw 121 engages the top of the work. All the jaws then move simultaneously toward the surface of the work. During the grinding operation the movement of shoes 127 and 128 is the same as that of shoes 36 and 37, Figs. 1 to 6 inclusive.

As the work is reduced in size the jaws will tend to swing further inwardly as the plunger moves forward. This movement may be indicated on the gage 113. In this way the gage may be used to indicate the size of the work.

Automatic sizing

Any of the above mentioned steady rests may be utilized to perform an additional function— that of sizing. Very little change need be made if the air sizing device disclosed in applicant's co-pending application 598,498, now Patent No. 2,001,447 dated May 14, 1935, is used. An air nozzle is mounted in any convenient position where it will be influenced by the movement of one of the shoes or an associated element. Since any movement of the shoes is in response to a corresponding change in size of the work, that movement may be utilized to actuate a sizing device. One method of applying the sizing device is disclosed in connection with Fig. 9. Obviously it could be adapted just as easily to other forms of the steady rest.

A nozzle 130 is mounted in the rear end of support 104 and directs fluid toward nut 112. As the work 129 is reduced in size, said nut moves toward nozzle 130 and reduces the flow of fluid therefrom, thus building up pressure in tube 133 and causing the mercury to rise toward contacts 136 and 137. When a first predetermined size is reached contact 136 is engaged by the mercury and a circuit closed to actuate solenoid 153 which in turn operates valve 151 to reduce the rate of feed of piston 147 by resisting the flow of fluid from dash pot 148, said flow of fluid being caused by the action of said piston on said dash pot, as described in applicant's co-pending application 623,225, now U. S. Patent No. 2,023,777, dated December 10, 1935. When a second predetermined size is reached, a circuit is closed thru contact 137 to energize solenoid 138 which shifts valve 139 and directs fluid thru passage 145 to piston 147. Said piston may be attached to a tool support and the movement resulting from the above described operation may be for the purpose of withdrawing the tool support and tool from working position. This function also is described in the above mentioned co-pending application. The dash pot 148 is reset by spring 149 upon withdrawal of piston 147'.

Having thus fully described my said invention, what I claim as new and desire to secure by Letters Patent, is:

1. A work-rest comprising a base, a carrier on said base, a pair of jaws pivotally mounted on said carrier, a plunger mounted in said carrier and movable toward and from the work, said plunger having means thereon engageable with the jaws to move them into engagement with the work.

2. A work-rest comprising a base, a carrier movably mounted on said base, a pair of jaws pivotally mounted on said carrier, a plunger movable in said carrier, said plunger having a work engaging shoe, means on the plunger for moving said jaws into engagement with the work as the said shoe is brought into engagement with the work.

3. A work-rest comprising a base, a carrier movably mounted in the base, a plunger movable in the carrier, a fluid motor for moving said plunger and said carrier, a pair of jaws pivotally mounted on said carrier, cams on said plunger engageable with said jaws to move them into engagement with the work when the plunger has moved a predetermined distance relative to the carrier.

4. A work-rest comprising a carrier, a fluid motor for moving said carrier toward and from the work, a pair of jaws pivotally mounted on said carrier, a plunger movable in said carrier for operating said jaws when the carrier has been moved to a predetermined position, said plunger having a work engaging shoe cooperating with shoes on the said jaws to grip the work about its periphery to hold the work in firm centered position.

5. A work-rest comprising a carrier, a plunger mounted in said carrier, said carrier having a pair of work engaging jaws mounted thereon, a fluid motor for moving said plunger toward and from the work, resilient connection between said plunger and said carrier for moving the latter by the former, a stop for limiting the movement of said carrier toward the work, and means on the plunger for operating the jaws to bring them into work engaging position when the carrier has reached the limit of its movement toward the work.

6. A work-rest comprising a support having a work engaging jaw mounted thereon, a plunger having a cam engageable with said work engaging jaw, a fluid motor for operating said plunger, a second work engaging jaw mounted on said plunger, a stop positioned on said support and engageable by said last named work engaging jaw to cause said jaw to move into engagement with the work when the plunger has reached a predetermined forward position.

7. A work-rest comprising a plunger, a fluid motor for operating said plunger, a work engaging jaw pivotally mounted on said plunger, an adjustable stop engageable by one end of said jaw to cause the jaw to pivot to work engaging position when the plunger reaches a predetermined forward position, said plunger having a work engaging shoe in its forward end engageable with the work simultaneously with the engagement of the work by the said pivoted jaw, and a second jaw pivoted independently of said plunger and operated by said plunger.

8. A work-rest comprising a support, a work engaging jaw pivotally mounted on said support, a lever mounted on said support and a second work engaging jaw pivotally mounted on said lever, a plunger having cams thereon engageable with said jaws for moving them into work engaging position, and a fluid motor for operating said plunger.

9. In a device of the kind described, an element movable toward and from a work piece, a second element movable with said first mentioned element, work engaging portions on said elements, means to move said elements toward a work piece, means to stop one of said elements to locate the work engaging portions carried thereby in a predetermined position relative to the work piece, means whereby the movement of the other element is continued and means responsive to said continued movement to bring each of said work engaging portions into contact with said work piece.

10. In a device of the kind described, an element movable toward and from a work piece, a second element movable with said first mentioned element, work engaging portions on said elements, means to move said elements toward a work piece, means to stop one of said elements to locate the work engaging portions carried thereby in a predetermined position relative to the work piece, means whereby the movement of the other element is continued, means responsive to said continued movement to bring each of said work engaging portions into contact with said work piece and to maintain said contact during a grinding operation, means whereby each of said work engaging portions is moved during grinding thru a distance equal to the change in size of the work piece and a sizing device responsive to movement of one of said elements for controlling the grinding operation.

11. In a grinding machine a steady rest comprising a plurality of work engaging surfaces, a plunger movable relative to a work piece, means responsive to movement of said plunger for moving said work engaging surfaces in the same direction from a remote inoperative position to an operative position adjacent the work means responsive to a further movement of said plunger for moving said work engaging surfaces radially and simultaneously into contact with the work surface and for maintaining said contact during the grinding operation.

12. In a grinding machine a steady rest comprising, a plunger movable relative to a work piece hydraulic motor for moving said plunger, three or more work engaging surfaces, means responsive to movement of said plunger for moving said work engaging surfaces in the same direction from a remote inoperative position to an operative position adjacent the work, means responsive to a further movement of said plunger for moving said work engaging surfaces radially and simultaneously into contact with the work surface and for maintaining said contact during the grinding operation.

13. In a device of the kind described comprising a stationary element and a movable element, work engaging means adapted to be moved by said movable element, means to move said movable element from a remote inoperative position to an operative position adjacent a work piece, means to determine said operative position comprising a stop mounted in one of said elements, a second stop mounted in the other of said elements and adapted to engage said first mentioned stop, the contacting faces of said stops lying in a plane at an angle to the direction of movement of said movable element whereby to provide a wedging action between said elements.

14. In a steady rest, a stationary element and a movable element, one or more work engaging shoes adapted to be moved by said movable element, means to move said movable element from a remote inoperative position to a work engaging position adjacent a work piece and means responsive to said movement to wedge said elements together in said work engaging position.

15. A steady rest having a base, a plurality of work engaging elements movable relative to said base for engaging a work piece, means for preventing any change in the position of the center of rotation thereof, means for moving each of said work engaging elements simultaneously during a grinding operation through a distance proportional to the change in size of a work piece, a sizing device for controlling operation of a machine and having an element mounted in fixed relation to said base and means movable with the work engaging element for cooperating with said sizing device element for effecting operation of said sizing device.

16. In a device of the kind described, an element movable toward and from a work piece, a second element movable with said first mentioned element, work engaging portions on said elements, means to move said elements toward a work piece, means to stop one of said elements to locate the work engaging portions carried thereby in a predetermined position relative to the work piece, means whereby the movement of the other element is continued, a sizing device including a nozzle for discharging a stream of fluid under pressure, means movable with said work engaging elements during a grinding operation for varying the discharge of fluid from said nozzle whereby to actuate said sizing device.

17. A steady rest comprising a guide member and a slide member having co-acting bearing surfaces, one or more work engaging shoes movably mounted on said slide member, means for moving said slide relative to said guide so as to bring said shoe or shoes to a predetermined position adjacent the work and means operable to stop the movement of said slide and clamp said surfaces together substantially simultaneously.

18. In a metal working machine, a work engaging member, a support therefor, a base member with which said support makes sliding contact, and a combined stop and clamping means constructed and disposed relative to said support for the work engaging member and said base so that said support is forced into clamping engagement with said base and stopped in a predetermined set position.

HAROLD E. BALSIGER.